(12) United States Patent  
Kallhammer et al.

(10) Patent No.: US 8,471,911 B2
(45) Date of Patent: *Jun. 25, 2013

(54) NIGHT VISION ARRANGEMENT

(75) Inventors: Jan-Erik Kallhammer, Linkoping (SE); Dick Eriksson, Alingsas (SE); Lars Karlsson, Taby (SE); Staffan Straat, Enebyberg (SE)

(73) Assignees: Autoliv Development AB, Vårgårda (SE); Flir Systems, Inc., Portland, OR (US)

(*) Notice: Subject to any disclaimer, the term of this patent is extended or adjusted under 35 U.S.C. 154(b) by 1370 days.

This patent is subject to a terminal disclaimer.

(21) Appl. No.: 11/841,390

(22) Filed: Aug. 20, 2007

(65) Prior Publication Data

US 2008/0043105 A1 Feb. 21, 2008

Related U.S. Application Data

(63) Continuation of application No. 10/372,662, filed on Feb. 25, 2003, now abandoned, which is a continuation of application No. 10/179,035, filed on Jun. 26, 2002, now abandoned, which is a continuation-in-part of application No. PCT/SE01/02253, filed on Oct. 16, 2001, and a continuation-in-part of application No. PCT/SE02/00785, filed on Apr. 23, 2002.

(30) Foreign Application Priority Data

Oct. 26, 2000 (SE) .................................. 0003942

(51) Int. Cl.
*H04N 5/30* (2006.01)
*H04N 5/335* (2006.01)

(52) U.S. Cl.
USPC ........................................................ 348/162

(58) Field of Classification Search
None
See application file for complete search history.

(56) References Cited

U.S. PATENT DOCUMENTS

| | | | |
|---|---|---|---|
| 3,505,465 A * | 4/1970 | Rees | 348/36 |
| 3,641,613 A | 2/1972 | Povilaitis et al. | |
| 3,979,158 A * | 9/1976 | Yamashita et al. | 359/861 |
| 4,101,202 A | 7/1978 | Tesh | |
| 4,110,012 A * | 8/1978 | Jarvis | 359/863 |
| 4,533,226 A | 8/1985 | Odone | |
| 4,820,031 A * | 4/1989 | Kastendieck et al. | 313/524 |

(Continued)

FOREIGN PATENT DOCUMENTS

| | | |
|---|---|---|
| DE | 1 630 943 | 3/1971 |
| DE | 3900667 A1 | 7/1990 |

(Continued)

OTHER PUBLICATIONS

Office Action issued for U.S. Appl. No. 10/423,009 on Sep. 22, 2006.

(Continued)

*Primary Examiner* — Nhon Diep
(74) *Attorney, Agent, or Firm* — Austin Rapp & Hardman

(57) ABSTRACT

In a night vision arrangement for a motor vehicle a camera is provided which captures an image which is subsequently displayed on a display arrangement which may be a head-up display arrangement. The camera directs light on to a beam deflector which may be constituted by a mirror which deflects the beam so that it passes along a neck on to a sensor. The camera may relatively easily be mounted in position in a motor vehicle.

20 Claims, 12 Drawing Sheets

U.S. PATENT DOCUMENTS

| | | | |
|---|---|---|---|
| 5,414,439 | A | 5/1995 | Groves et al. |
| 5,473,364 | A | 12/1995 | Burt |
| 5,619,036 | A | 4/1997 | Salvio et al. |
| 5,621,460 | A | 4/1997 | Hatlestad et al. |
| 5,646,612 | A | 7/1997 | Byon |
| 5,660,454 | A | 8/1997 | Mori et al. |
| 5,760,884 | A | 6/1998 | Yahashi et al. |
| 5,828,585 | A | 10/1998 | Welk et al. |
| 6,000,814 | A | 12/1999 | Nestell et al. |
| 6,101,048 | A * | 8/2000 | Wheeler .................. 359/742 |
| 6,104,552 | A | 8/2000 | Thau et al. |
| 6,347,010 | B1 | 2/2002 | Chen et al. |
| 6,384,741 | B1 | 5/2002 | O'Leary, Sr. |
| 6,388,566 | B1 | 5/2002 | Perlo et al. |
| 6,467,940 | B2 | 10/2002 | Eschler et al. |
| 6,538,622 | B1 | 3/2003 | Kojima et al. |
| 6,550,949 | B1 | 4/2003 | Bauer et al. |
| 6,593,960 | B1 | 7/2003 | Sugimoto et al. |
| 6,840,342 | B1 | 1/2005 | Hahn |
| 6,897,892 | B2 | 5/2005 | Kormos |
| 6,977,630 | B1 | 12/2005 | Donath et al. |
| 7,092,007 | B2 | 8/2006 | Eguchi et al. |
| 2002/0001198 | A1 | 1/2002 | Eschler et al. |
| 2002/0067413 | A1 | 6/2002 | McNamara |
| 2003/0095688 | A1 | 5/2003 | Kirmuss |
| 2003/0202097 | A1 | 10/2003 | Kallhammer et al. |
| 2003/0227424 | A1 | 12/2003 | Lynch et al. |
| 2004/0061931 | A1 | 4/2004 | Kallhammer et al. |
| 2004/0085447 | A1 | 5/2004 | Katta et al. |
| 2004/0150515 | A1 | 8/2004 | Kallhammer et al. |
| 2004/0227083 | A1 | 11/2004 | Kallhammer et al. |
| 2006/0209182 | A1 | 9/2006 | Eriksson |
| 2007/0200064 | A1 | 8/2007 | Remillard et al. |
| 2008/0043105 | A1 | 2/2008 | Kallhammer et al. |
| 2008/0049106 | A1 | 2/2008 | Kallhammer et al. |
| 2008/0198224 | A1 | 8/2008 | Kallhammer et al. |

FOREIGN PATENT DOCUMENTS

| | | |
|---|---|---|
| DE | 3942249 A1 | 7/1990 |
| DE | 19940723 A1 | 3/2001 |
| EP | 0455524 | 11/1991 |
| EP | 0455524 A1 | 11/1991 |
| EP | 0677955 A2 | 10/1995 |
| EP | 0686865 A1 | 12/1995 |
| EP | 758834 | 2/1997 |
| EP | 0758834 A2 | 2/1997 |
| EP | 1024057 A2 | 8/2000 |
| FR | 2785434 | 5/2000 |
| GB | 1142910 | 2/1969 |
| JP | 61135842 | 6/1986 |
| JP | 4093786 | 3/1992 |
| JP | 4274941 | 9/1992 |
| JP | 6048247 | 2/1994 |
| JP | 06064479 A | 3/1994 |
| JP | 6321011 | 11/1994 |
| JP | 07043209 A | 2/1995 |
| JP | 08009224 A | 1/1996 |
| JP | 8058470 | 3/1996 |
| JP | 8161698 | 6/1996 |
| JP | 9052555 | 2/1997 |
| JP | 9243392 | 9/1997 |
| JP | 9315225 | 12/1997 |
| JP | 10258682 | 9/1998 |
| JP | 10264724 A | 10/1998 |
| JP | 11263145 | 9/1999 |
| JP | 11348659 | 12/1999 |
| JP | 2000062653 A | 2/2000 |
| JP | 2000-182196 | 6/2000 |
| JP | 2000205949 | 7/2000 |
| JP | 2000264128 | 9/2000 |
| JP | 2000-285394 | 10/2000 |
| JP | 2001039218 A | 2/2001 |
| JP | 2001058543 A | 3/2001 |
| JP | 2001958543 A | 3/2001 |
| JP | 2001-150977 A | 6/2001 |
| JP | 2001233139 A | 8/2001 |
| SE | 0003942-0 | 10/2000 |
| SE | 00039438 | 10/2000 |
| SE | 519 864 | 4/2003 |
| WO | WO 0068910 | 11/2000 |
| WO | WO-01/29513 A1 | 4/2001 |
| WO | WO-0146739 A2 | 6/2001 |
| WO | WO 0163335 A2 | 8/2001 |
| WO | WO 0181972 A2 | 11/2001 |
| WO | WO 0205013 | 1/2002 |
| WO | WO-02/34572 A1 | 2/2002 |
| WO | WO 0234572 | 5/2002 |
| WO | WO 0236389 | 5/2002 |
| WO | WO-03/091069 A1 | 6/2003 |

OTHER PUBLICATIONS

Office Action issued for U.S. Appl. No. 10/423,054 on Jul. 19, 2007.
Office Action issued for U.S. Appl. No. 10/423,054 on Sep. 26, 2006.
Office Action issued for U.S. Appl. No. 10/512,391 on Mar. 28, 2008.
Office Action issued for U.S. Appl. No. 10/512,391 on Oct. 1, 2008.
Office Action issued for U.S. Appl. No. 10/512,391 on Jan. 16, 2009.
Office Action issued for U.S. Appl. No. 10/753,191 on Feb. 12, 2007.
Office Action issued for U.S. Appl. No. 11/837,370 on Sep. 8, 2008.
Preliminary Examination Report issued for PCT Patent Application No. PCT/SE01/02253 on Jan. 7, 2003.
Preliminary Examination Report issued for PCT Patent Application No. PCT/SE01/02283 on Jan. 21, 2003.
Preliminary Report on Patentability issued for PCT Patent Application No. PCT/SE02/00785 on Mar. 2, 2004.
Search Report issued for PCT Patent Application No. PCT/SE01/02253 on Jan. 30, 2002.
Search Report issued for PCT Patent Application No. PCT/SE01/02283 on Feb. 15, 2002.
Search Report issued for PCT Patent Application No. PCT/SE02/00785 on Nov. 25, 2002.
Advisory Action issued for U.S. Appl. No. 10/372,662 on Jun. 19, 2007.
Final Office Action issued for U.S. Appl. No. 10/423,054 on Mar. 12, 2007.
Final Office Action issued for U.S. Appl. No. 10/423,009 on Jun. 29, 2007.
Final Office Action issued for U.S. Appl. No. 11/837,370 on Jun. 9, 2009.
Notice of Abandonment issued for U.S. Appl. No. 10/372,662 on Nov. 15, 2007.
Notice of Abandonment issued for U.S. Appl. No. 10/423,054 on Mar. 24, 2009.
Notice of Abandonment issued for U.S. Appl. No. 10/753,191 on Sep. 13, 2007.
Notice of Allowance issued for U.S. Appl. No. 10/512,391 on Jun. 5, 2009.
Office Action issued for U.S. Appl. No. 10/372,662 on Feb. 23, 2007.
Office Action issued for U.S. Appl. No. 10/423,009 on Jan. 31, 2007.
Office Action Issued for U.S. Appl. No. 10/372,662 on Jul. 27, 2006.
Final Office Action Issued for U.S. Appl. No. 10/372,662 on Feb. 23, 2007.
Office Action Issued for U.S. Appl. No. 11/837,370 on Dec. 31, 2009.
Final Office Action Issued for U.S. Appl. No. 11/837,370 on Sep. 15, 2010.
Office Action Issued for U.S. Appl. No. 12/026,231 on Apr. 28, 2011.
Final Office Action Issued for U.S. Appl. No. 12/026,231 on Nov. 15, 2011.

* cited by examiner

NIGHT VISION ARRANGEMENT

CROSS-REFERENCED RELATED APPLICATIONS

This application is a continuation of U.S. patent application Ser. No. 10/372,662, filed Feb. 25, 2003, which is a continuation of U.S. patent application Ser. No. 10/179,035 filed on Jun. 26, 2002, which is a continuation-in-part of International Patent Application PCT/SE01/02253 filed on Oct. 16, 2001 designating the United States and claiming priority to Swedish Application No. 0003942-0 filed on Oct. 26, 2000 and also a continuation-in-part of International Patent Application PCT/SE02/00785 filed on Apr. 23, 2002, designating the United States. The disclosures of the foregoing applications/documents and the U.S. patents mentioned below are incorporated herein by reference in their entirety.

BACKGROUND OF THE INVENTION

The present invention relates to a night vision arrangement in the form of a device for the enhancement of night vision in a vehicle, such as an automobile.

It has been proposed previously to provide a night vision arrangement in an automobile. U.S. Pat. No. 5,414,439 discloses an arrangement in which a vehicle is equipped with an infra-red sensitive camera which is directed to capture an image of the roadway in front of the vehicle. The camera provides an output in the form of a video signal which is processed by a video processor, and which is then passed to a head-up display. It has been known previously to provide head-up display units in vehicles such as combat aircraft to enable the pilots of the aircraft to view, simultaneously, the scene on the exterior of the aircraft, and also an image projected on to the head-up display. U.S. Pat. No. 5,414,439 utilises a head-up display of this general type to enable the driver of the vehicle to view the road in front of the vehicle and, simultaneously, to see an image derived from the infra-red camera.

In the arrangement of U.S. Pat. No. 5,414,439, the windshield is provided with a semi-transparent mirror which is utilised as a combiner to combine the real image of the road in front of the vehicle as viewed by the driver, and a virtual image of the road ahead.

The infra-red sensitive camera of U.S. Pat. No. 5,414,439 is of conventional design incorporating a lens arrangement which serves to focus an image on a relatively large sensor element which is located in alignment with the optical axis of the lens arrangement. The entire camera is rather bulky and the positioning of the camera is shown, schematically, with the camera being mounted within the engine compartment of the vehicle.

SUMMARY OF THE INVENTION

The present invention seeks to provide an improved night vision arrangement.

According to this invention there is provided a night vision arrangement for a vehicle, the night vision arrangement incorporating a camera, the camera comprising an optical element which is substantially transparent to at least infra-red light, and an infrared sensor to capture an image received through the optical element, there being a display unit to display the captured image to a driver of the vehicle, characterised in that the optical element defines an optical axis, and within the camera a beam deflector is provided in alignment with the optical axis adapted to deflect the beam received through the optical element and to direct the deflected beam on to the sensor. In one embodiment, the optical element may comprise a light collecting lens. In an alternative embodiment, the optical element may comprise a non-distorting window which is substantially transparent to infra-red light.

Preferably the beam deflector is adapted to deflect the beam through approximately 90 degree. The angle of deflection of the beam deflected by the beam deflector does depend upon the detailed design of the camera, and the intended location of the camera. It is intended that the camera should be mounted in position with only the optical element exposed.

Conveniently the beam deflector comprises a mirror. Alternatively the beam deflector may comprise a prism or some other optical unit which deflects the beam. Preferably a separate, focusing lens is located between the deflector and the sensor for focusing light which is passed through the optical element onto the sensor. The deflector and focusing lens may also be located within a sealed housing, wherein the optical element comprises a part of the sealed housing.

Advantageously a part of the camera containing the sensor is mounted within the envelope of the vehicle, with the optical element being positioned or positionable on the exterior of the vehicle. If the main part of the camera, which contains the sensor, is mounted within the envelope of the vehicle, the aerodynamic property of the vehicle will not be influenced substantially by the camera arrangement. Also, the mounting of the camera in position, during the assembly of the vehicle, may be facilitated.

Conveniently means are provided to heat the optical element of the camera. This may minimise any problems that might otherwise arise due to condensation.

Advantageously means are provided to protect the optical element from the environment. Thus the optical element may be protected from the environment at times when the night vision arrangement is not in use.

In one embodiment the means provided to protect the optical element from the environment comprise a cover movable to a position in which the optical element is covered.

In another embodiment the means to protect the optical element comprise means to move the camera and the optical element so that the optical element is in a retracted and protected position.

Preferably the camera is mounted in position for pivotal movement about a horizontal axis parallel with the axis of the vehicle between an operative position and a retracted position, a wiper being provided to wipe the optical element as the camera moves.

In an alternative embodiment the camera is incorporated into a mirror housing.

In another modified embodiment the camera is mounted in a fender or bumper.

Conveniently the camera is mounted to be moved vertically between an operative position and a retracted position.

Alternatively the camera is provided with a cover movable between a retracted position in which the optical element is exposed, and a closed position in which the optical element is covered.

In another embodiment of the invention the camera is adapted to be mounted on the roof of a vehicle.

Conveniently the cover is incorporated in a roof mounted aerial.

Alternatively the camera is incorporated in a roof rail.

According to another embodiment of this invention there is provided a device for the enhancement of night vision in a vehicle like an automobile. The device comprises an infra-red camera for being mounted on the vehicle to view an area in front of the camera, and generating a video signal representing the thermal image of the area, the camera comprising an optical element for passing light therethrough, and an infrared sensing means for sensing the light passed through the optical element, and an optical means having an elongated neck and conveying infra-red radiation received through the optical element to the infra-red sensing means. The device further comprises a processing unit for processing signals from the sensing means; and a display unit coupled to the processing unit for making an image visible to the vehicle operator.

BRIEF DESCRIPTION OF THE DRAWINGS

In order that the invention may be more readily understood, and so that further features thereof may be appreciated, the invention will now be described by way of example, with reference to the accompanying drawings in which.

DETAILED DESCRIPTION OF THE INVENTION

Figure 1:
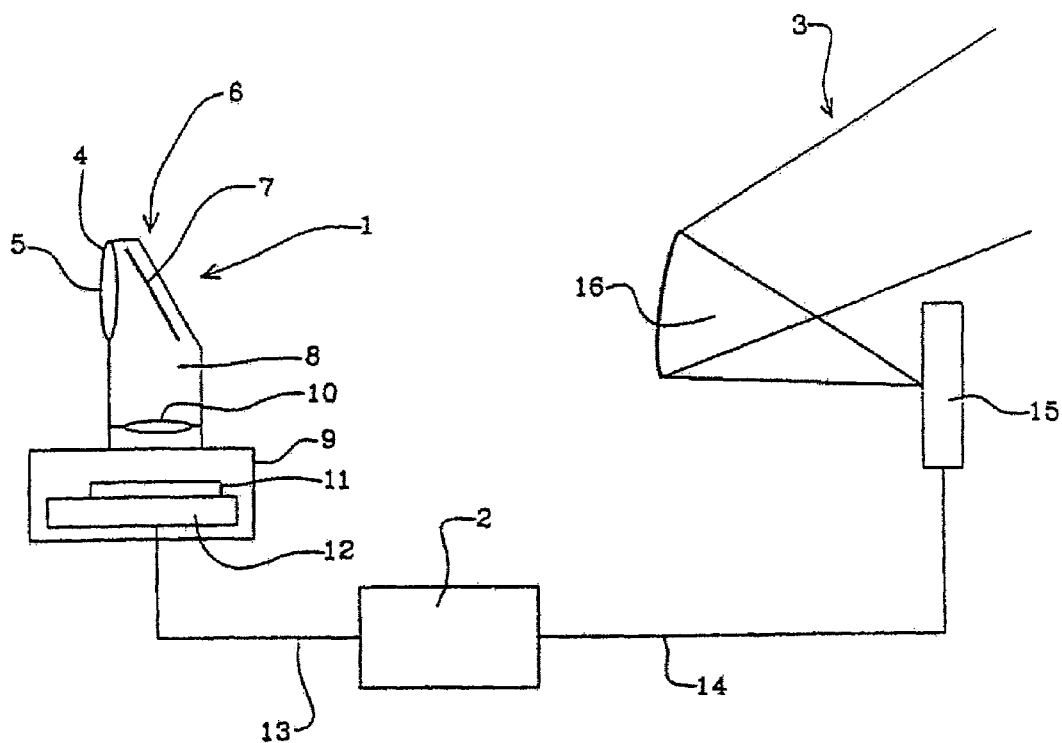
FIG. 1 is a schematic illustration of a night vision arrangement for a motor vehicle in accordance with the invention.

Referring initially to FIG. 1 of the accompanying drawings, a night vision arrangement for a vehicle such as motor car comprises a camera arrangement 1 to capture an image, a signal processing unit 2 and a display arrangement 3 adapted to display an image.

The camera arrangement 1 comprises a lens 4 through which infra-red light, forming an image, is to pass into the interior of the camera.

The lens 4 defines an optical axis, and, when the camera unit 1 is positioned on a motor vehicle, the optical axis in front of the lens is directed towards the roadway in front of the vehicle, so that the camera can capture an image of the roadway in front of the vehicle.

Behind the lens 4, in alignment with the optical axis, a beam deflector 6 which, in the illustrated embodiment of the invention, is constituted by a mirror 7 which is inclined at substantially 45.degree. to the optical axis of the lens. Thus the beam deflector 6 serves to deflect the beam passing through the lens 4 by approximately 90.degree.

The beam deflector 6 is connected, by means of an elongate hollow neck 8, to a main housing 9 of the camera 1. Contained within the elongate neck 8 is a focusing lens 10, which serves to focus light from the beam deflector 6 on to a sensor 11 present within the housing 9. The sensor 11 is an infra-red sensor, and may comprise a microbolometer. The sensor may be a charge-coupled device. The sensor is shown mounted on an electronic unit 12 which receives the signals from the sensor and which provides an output on the output lead 13.

It is to be understood, therefore, that the infra-red sensitive camera 1 is provided with a housing 9 which contains an infra-red sensor 11 which is adapted to capture an image, and the housing 9 is connected by means of a hollow neck 8 extending to a beam deflector 6 which is located adjacent the lens 4. The housing may be sealed to prevent the ingress of dirt or moisture.

In an alternative arrangement, the optical element may be formed by one face of a prism that acts as the beam deflector.

The output 13 from the camera 1 passes through an image processor unit 2 which provides a signal on a lead 14 which passes to an image generator 15. The image generator 15 may be a cathode ray tube device, or some other equivalent arrangement. The image generator 15 is positioned at an appropriate location generally in front of a combiner 16, which may be mounted on the windshield of a motor vehicle, and which may be a semi-transparent aspheric mirror.

In use of the arrangement, as shown in FIG. 1, the camera 1 will be mounted in a motor vehicle so that the optical axis of the lens 4 is directed generally along the roadway in front of the motor vehicle, enabling the camera 1 to generate an infrared image of the roadway in front of the vehicle. That image is presented on the image generator 15. The driver of the vehicle may thus simultaneously view, in the combiner 16, the real image of the roadway outside the vehicle, and a virtual image of the roadway, as presented on the image generator 15.

Figure 2:
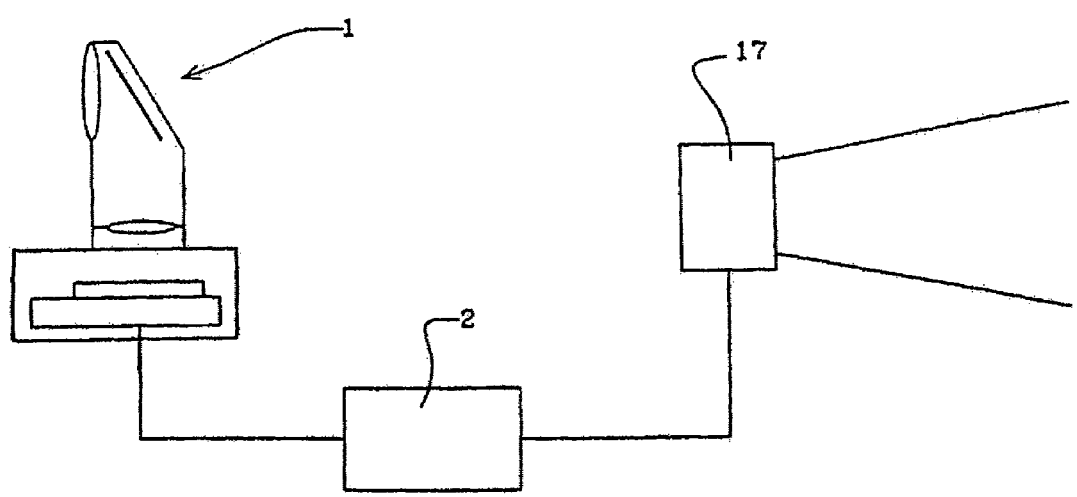
FIG. 2 is a view similar to that of FIG. 1 illustrating a modified embodiment of the invention.

FIG. 2 illustrates a second embodiment of the invention in which the camera 1 and signal processor 2 are exactly as described above with reference to FIG. 1. These components will not be re-described. In this embodiment the output 14 of the signal processing unit 2 is connected directly to a monitor 17, which may be in the form of a cathode ray tube or the like. The monitor 17 is located at a position where it can be viewed by the driver of a motor vehicle.

Figure 3:
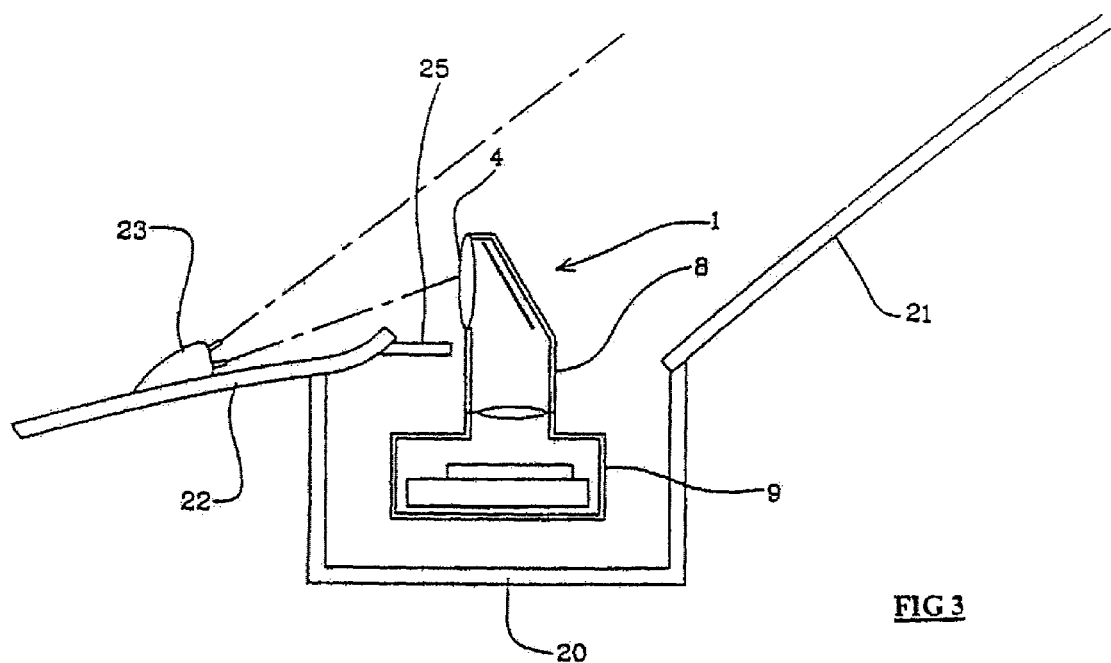
FIG. 3 is a diagrammatic side view illustrating a camera of one embodiment of the invention mounted in position on a motor vehicle.
Figure 4:
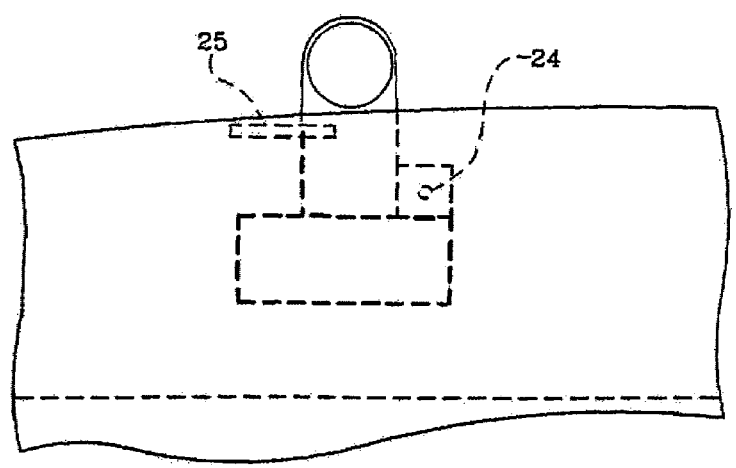
FIG. 4 is a front view of the camera of FIG. 3 in the operative position.
Figure 5:
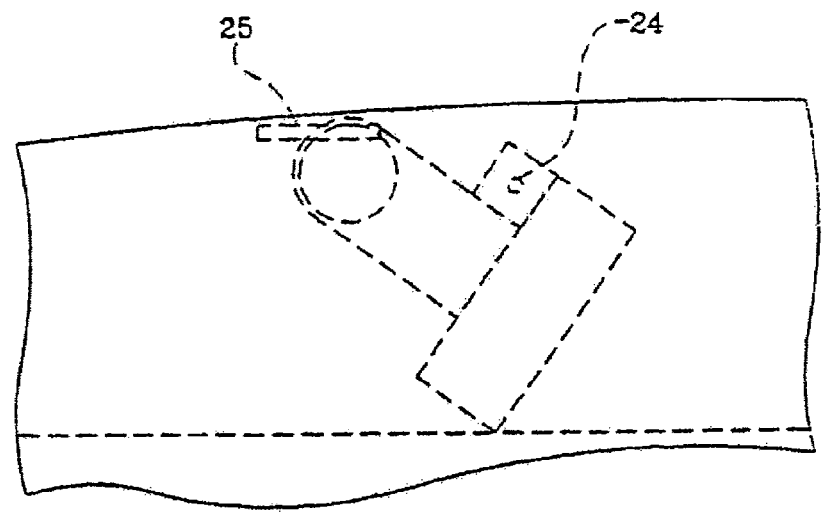
FIG. 5 is a front view corresponding to FIG. 4 illustrating the camera of FIG. 3 in a non-operative position.

Referring now to FIGS. 3 to 5, a camera 1, as described above, is illustrated mounted in position on a motor vehicle. The internal components of the camera are not shown in these figures.

Referring initially to FIG. 3, the camera 1 is mounted in position with the main housing 9 being located within a recess 20.

The camera 1 is located in position so that the main housing 9 is located within the recess, with the neck 8 extending vertically upwardly, so that the lens 4 is located above the envelope of the vehicle, thus ensuring that the lens 4 has an adequate "view" of the road in front of the vehicle. The main housing 9 is thus located within the main envelope defined by the vehicle, with only that part of the neck 8 carrying the lens 4 projecting beyond the envelope.

The camera 1 of the embodiment shown in FIGS. 3 to 5, is mounted in position for pivotal movement about a substantially horizontal pivot axis 21, the pivot axis being aligned with the axis of the vehicle. The entire camera may thus pivot from a first operative position, as shown in FIGS. 3 and 4, in which the lens 4 is located above the rear edge of the bonnet, to a retracted position, as shown in FIG. 5, in which the lens is positioned beneath the rear edge of the hood or bonnet. The lens, in this retracted position, is somewhat protected from the environment which may contain rain or dust.

It is to be appreciated that in the embodiment of FIGS. 3 to 5, the main housing 9 of the camera is, at all times, within the envelope of the vehicle, with the lens 4 being movable to the operative position where it extends beyond the envelope of the vehicle. The optical axis of the lens 4, when the camera is in the operative position, is very close to the actual line of sight of the driver of the vehicle, if the camera is positioned immediately in front of the driver. This serves to minimize any parallax error which might otherwise arise.

The camera of the embodiment of FIGS. 3 to 5 may be driven about the pivot axis 21 by means of an appropriate electric or hydraulic motor. The motor may be controlled so that the camera is only moved to the operative position when the night vision arrangement is actuated, although the driver may have a control which can be actuated to cause the camera to move from the operative position to the retracted position, and back again, so that the driver may effect a cleaning of the lens of the camera.

Figure 6:
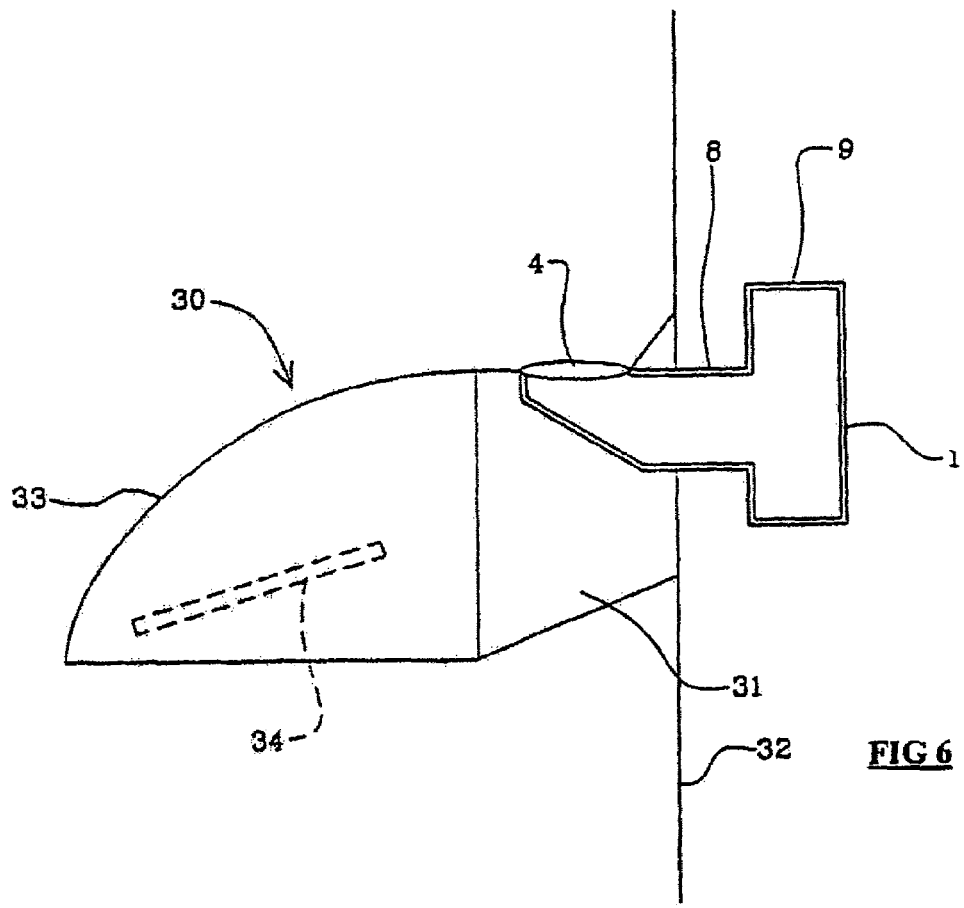
FIG. 6 is diagrammatic view illustrating a camera of another embodiment of the invention.

FIG. 6 illustrates another embodiment of the invention in which a camera 1 as described above is mounted in a motor vehicle, with the camera being mounted in position to form part of a wing mirror unit 30. Again, the internal components of the camera are not shown. The wing mirror unit 30 has a base portion 31 connected to part 32 of the door of a vehicle, and has an extension portion 33 which contains the actual mirror 34. In this embodiment the camera 1 is mounted in position with the main housing 9 being located within the door, and with the neck 8 extending horizontally into the base portion 31 of the wing mirror unit 30. The lens 4 is positioned in an appropriate aperture formed in the forward facing part of the base portion 31 of the wing mirror unit 30. The camera may easily be mounted in this position as the motor vehicle is fabricated.

Figure 7:
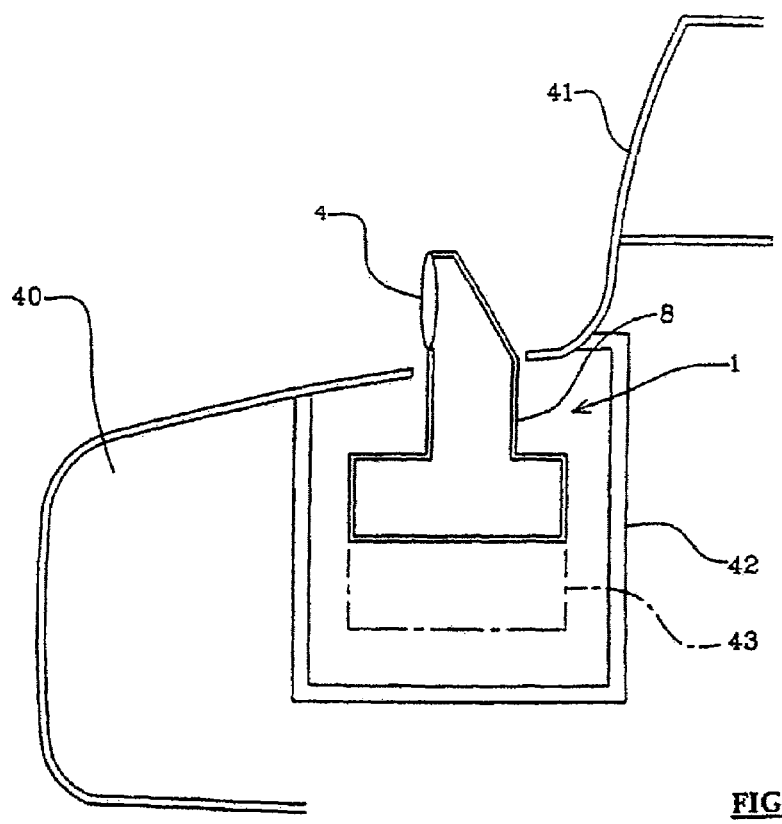
FIG. 7 is a diagrammatic view illustrating the camera of yet another embodiment of the invention.

Referring now to FIG. 7 of the accompanying drawings, a camera 1 of the type described above is shown mounted in position within the bumper or fender 40 of the motor vehicle. Again, the internal components of the camera are not shown. The camera 1 is shown in position beneath a headlight 41. The camera is mounted in position within a recess 42 formed in the bumper or fender with the housing 9 within the envelope of the vehicle. The camera is located in position with the neck 8 extending vertically upwardly so that the lens 4 is positioned immediately above the top surface of the bumper or fender 40. Preferably the camera is positioned immediately in front of the driver in order to minimise any parallax problems. In the illustrated embodiment, the camera may move vertically from an upper or elevated position, as shown in solid line, to a lower or retracted position as shown in dotted lines 43. When the camera is in the lower position the lens is retracted into the recess 42 formed in the bumper or fender 40, thus protecting the lens from the environment.

Figure 8:
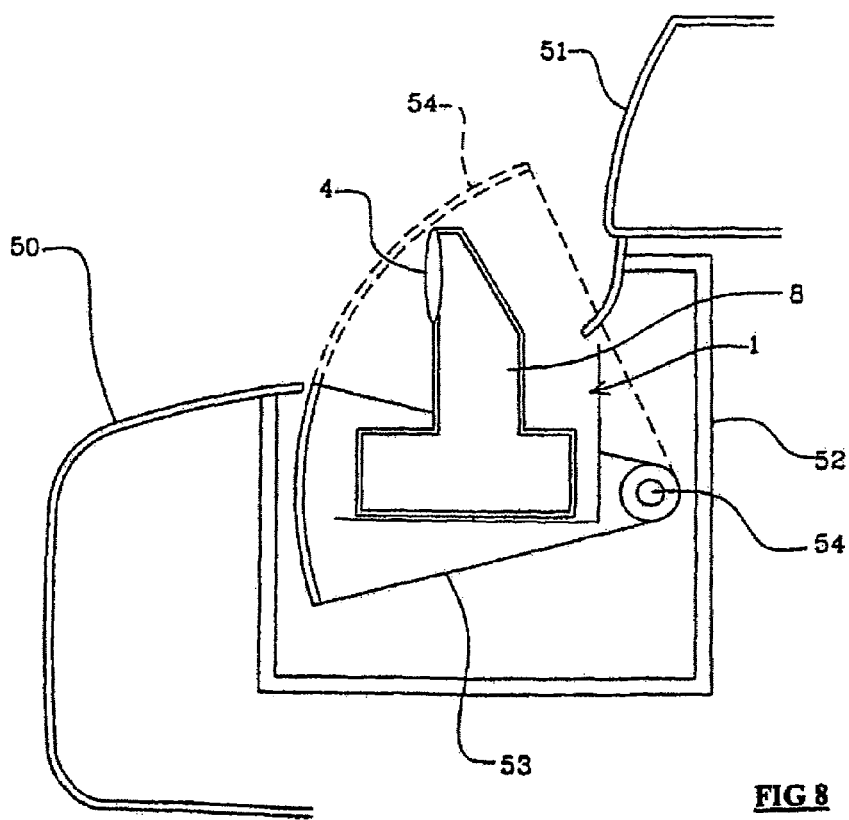
FIG. 8 is a diagrammatic side view illustrating the camera of a further embodiment of the invention.

FIG. 8 illustrates a further embodiment in which a camera 1 of the type described above is mounted in position within a bumper or fender 50 and in this figure the internal components of the camera are not shown. Again, the camera 1 is located adjacent a headlight 51. In this embodiment of the invention, the bumper or fender 50 defines a recess 52, and the camera 1 is mounted at a fixed position within the recess 52, with the housing 9 within the envelope of the vehicle. The neck 8 of the camera extends upwardly so that the lens 4 is positioned above the upper edge of the bumper or fender. Mounted within the bumper or fender is a pivotally movable cover 53. The cover 53 is adapted to pivot about a pivot axis 54. The cover may move from a retracted position, as shown in solid lines in FIG. 8, in which the lens 4 is exposed has a clear view across the top part of the bumper or fender 50, to a closed position, as shown in dotted lines 54 in FIG. 8, in which the cover 53 extends in front of and above the lens to cover and protect the lens 4.

Figure 9:
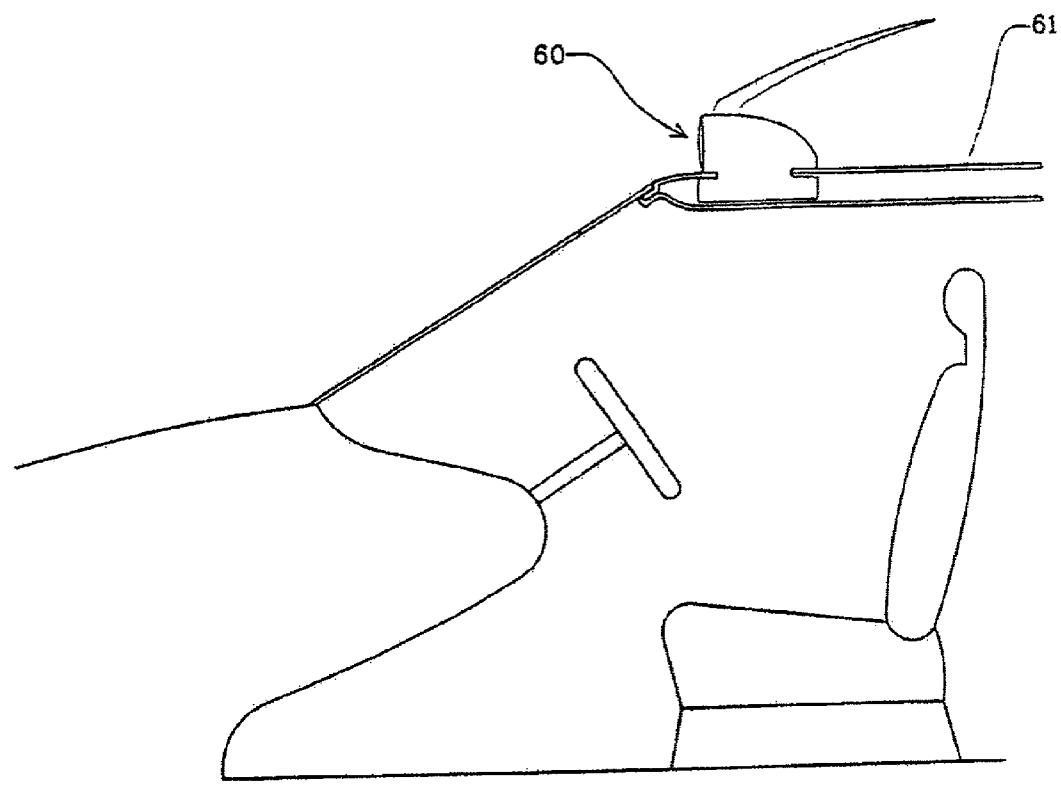
FIG. 9 is a diagrammatic side view of part of a motor vehicle provided with a camera forming part of the embodiment of the invention.
Figure 10:
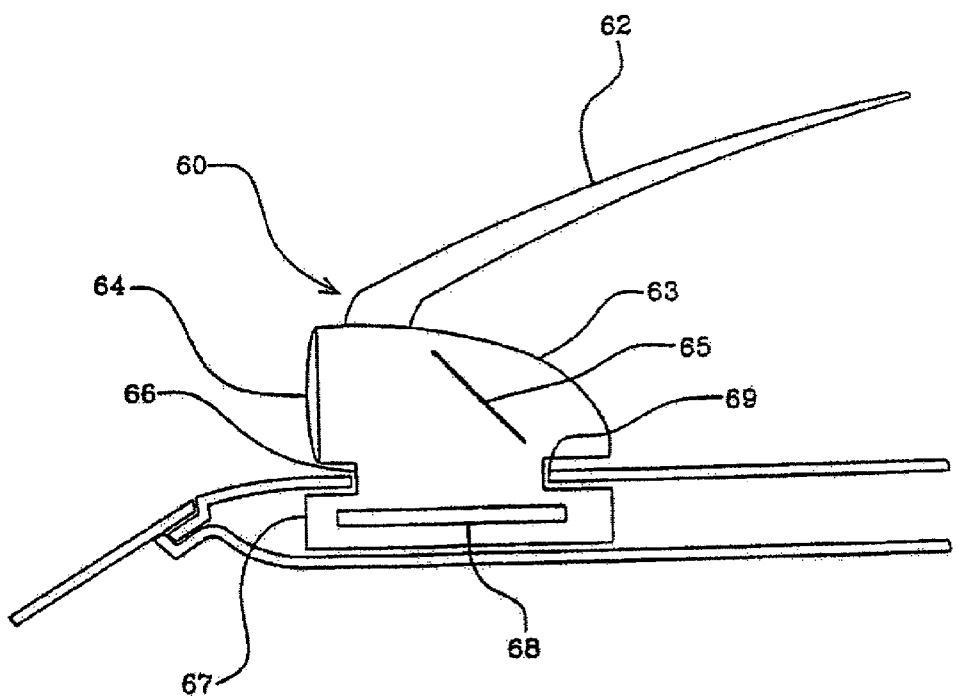
FIG. 10 is an enlarged view of part of FIG. 9.

Reference is now made to FIGS. 9 and 10 of the accompanying drawings in which an aerial unit 60 is shown mounted on the roof 61 of a motor vehicle. The internal components of the aerial unit are not shown in FIG. 9. The aerial unit 60 incorporates an aerial or antenna 62 mounted on an upper housing 63. The front part of the upper housing 63 is provided with a lens 64, similar to the lens 4 of the camera described above, the lens 64 having an optical axis aligned with a beam deflector 65 contained within the upper housing 63. The upper housing 63 is connected by means of a neck 66 which extends from the lower part of the upper housing 63, to a lower housing 67. Contained within the lower housing 67 is an image detector 68, corresponding to the image detector 11 described above. The beam deflector 65 deflects the beam entering the camera through the lens 64 by approximately 90.degree. so that the deflected beam impinges on the image detector 68. Thus the upper housing 63 and the lower housing 67 together constitute a camera which is, effectively, of the same operative design as the camera 1 described above. It is to be noted that the camera of the embodiments of FIGS. 9 and 10 is mounted in position with the neck 66 passing through an aperture 69 formed in the roof sheet of the vehicle. Thus the lower housing 67, containing the sensor 68, is mounted within the envelope of the vehicle. The lower housing 67 is larger than the aperture 69, and so the aerial unit 60 cannot easily be removed from the vehicle.

Figure 11:
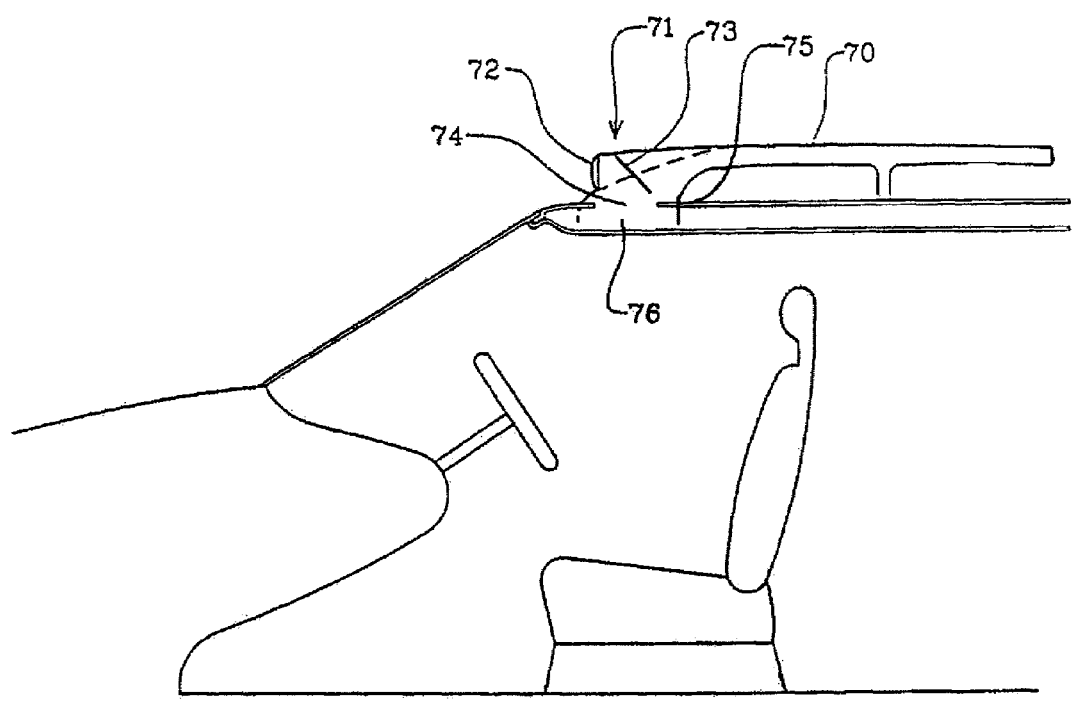
FIG. 11 is a side view of part of a vehicle provided with a camera forming part of yet another embodiment of an invention.

FIG. 11 illustrates a further embodiment of the invention in which a camera is incorporated within a roof rail of the motor vehicle. Referring to FIG. 11, a roof rail 70 of a motor vehicle has, at its forward-most end, a chamber 71, the front part of the chamber being provided with a lens 72. The lens 72 corresponds with the lens 4 as described above. Contained within the chamber 71 in alignment with the optical axis of the lens 72 is a beam deflector constituted, in this embodiment, by an inclined mirror 73. The lower part of the chamber 71 is connected, by means of a relatively narrow neck 74 which passes through an aperture 75 formed in the roof of the vehicle, the neck 74 terminating in an enlarged lower housing 76 which contains an infra-red sensor of the type described above. The beam entering the camera through the lens 72 is focused onto the infra-red sensor. It is to be appreciated that in this embodiment the housing containing the sensor is within the envelope of the vehicle.

Figure 12:
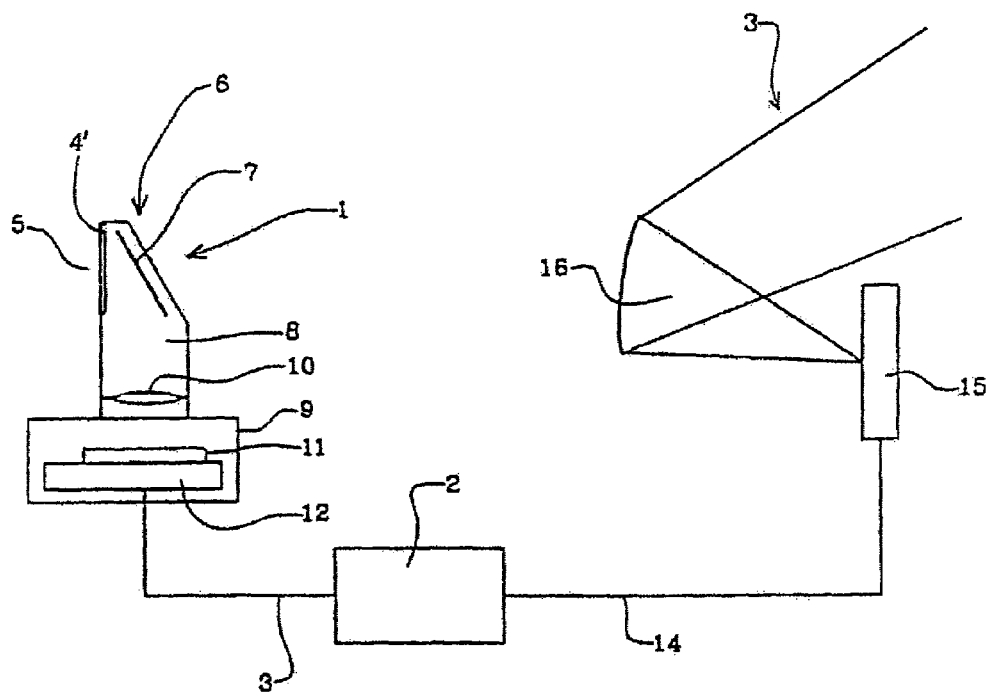
FIG. 12 is a schematic illustration of another alternate embodiment of a night vision arrangement for a motor vehicle in accordance with the invention.
Figure 13:
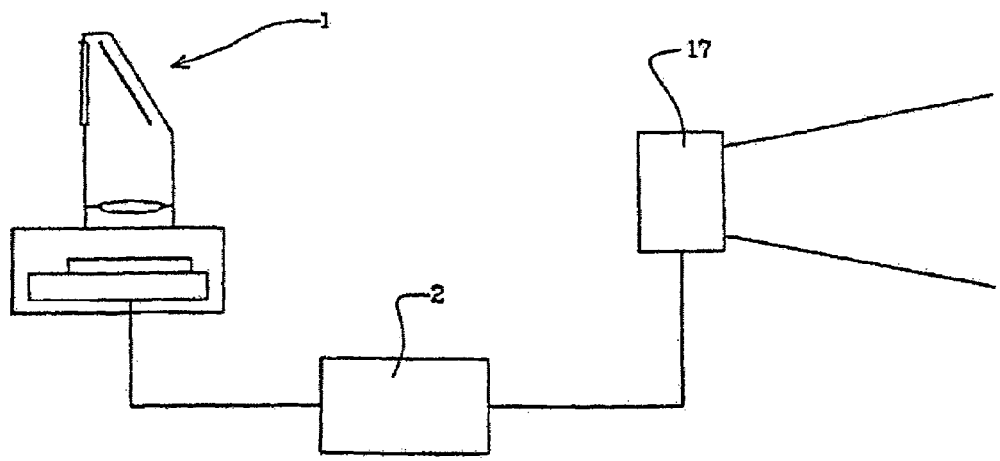
FIG. 13 is a view similar to that of FIG. 12 illustrating a modified embodiment of the invention.
Figure 14:
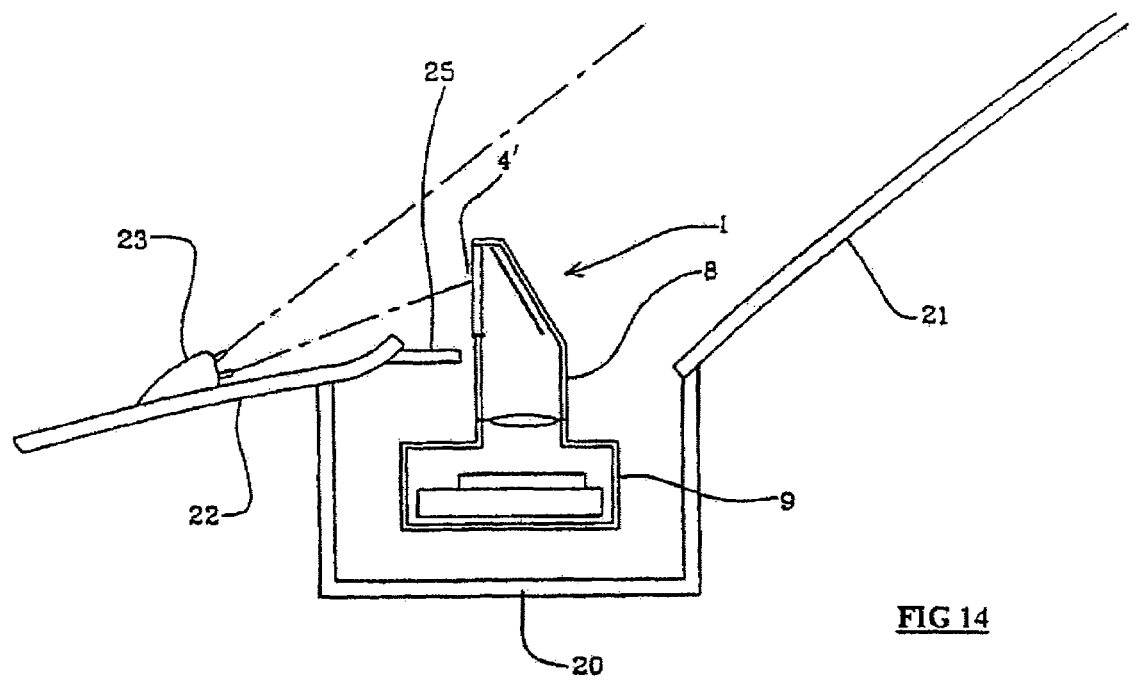
FIG. 14 is a diagrammatic side view illustrating a camera of yet another embodiment of the invention mounted in position on a motor vehicle.
Figure 15:
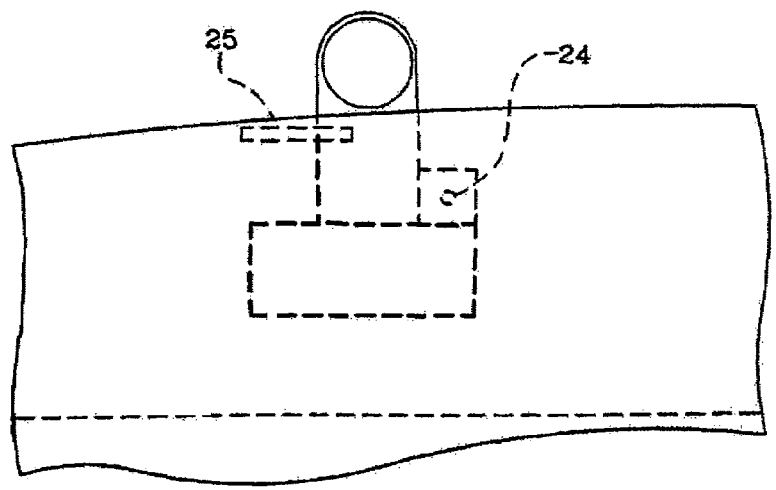
FIG. 15 is a front view of the camera of FIG. 14 in the operative position.
Figure 16:
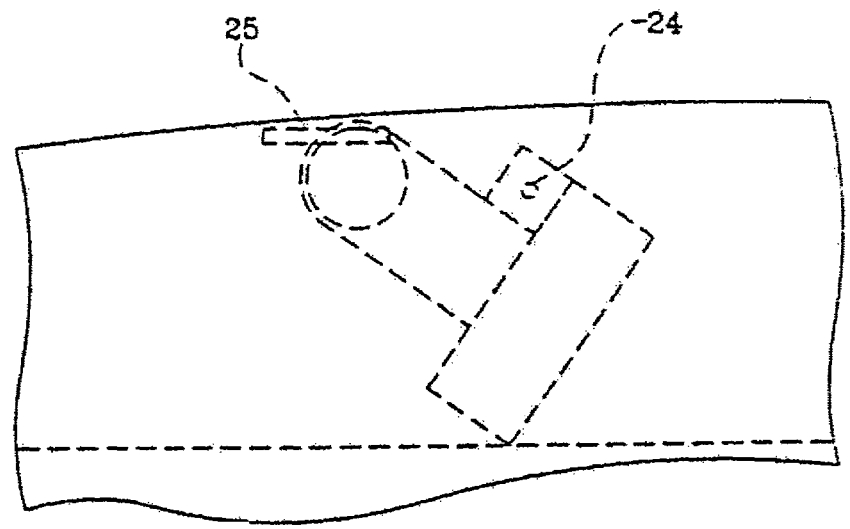
FIG. 16 is a front view corresponding to FIG. 15 illustrating the camera of FIG. 3 in a non-operative position.
Figure 17:
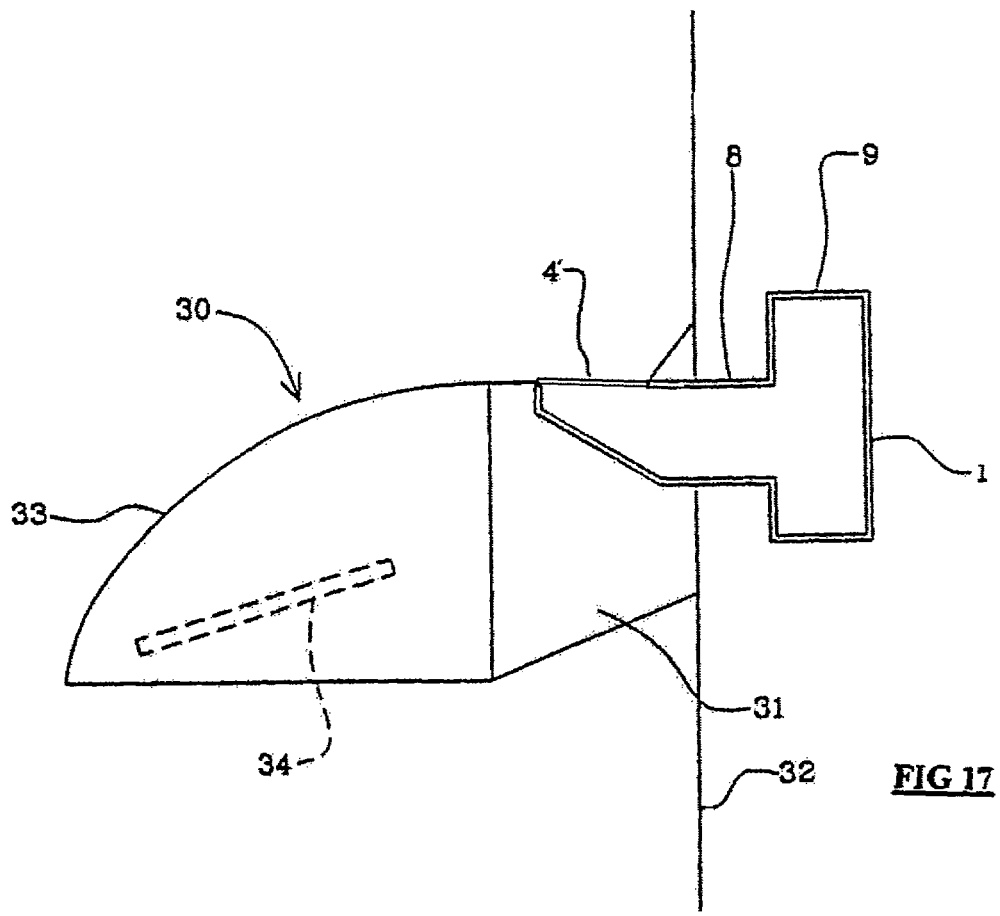
FIG. 17 is diagrammatic view illustrating a camera of another embodiment of the invention.
Figure 18:
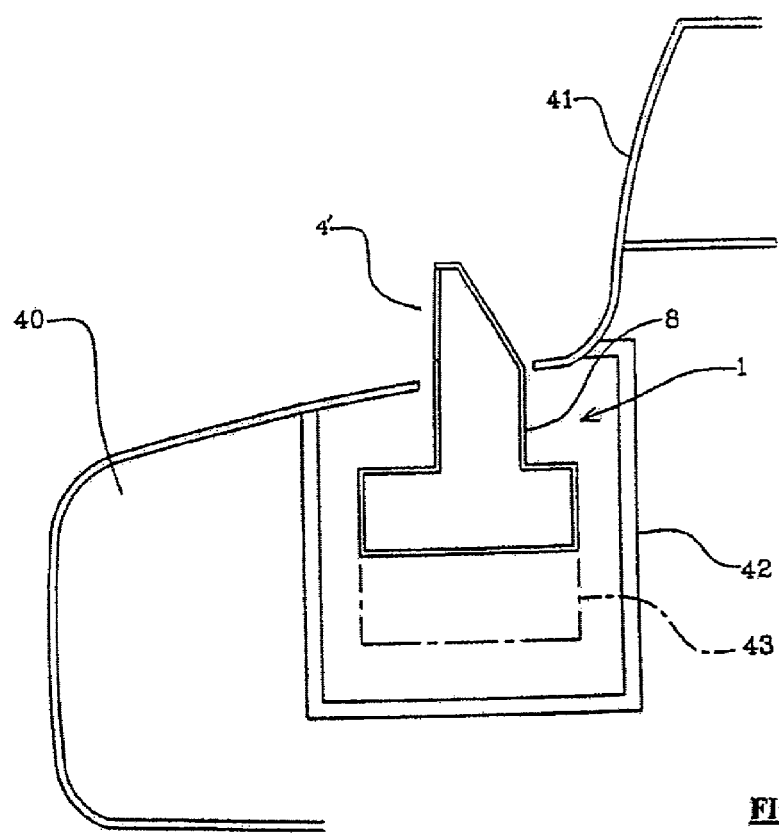
FIG. 18 is a diagrammatic view illustrating the camera of yet another embodiment of the invention.
Figure 19:
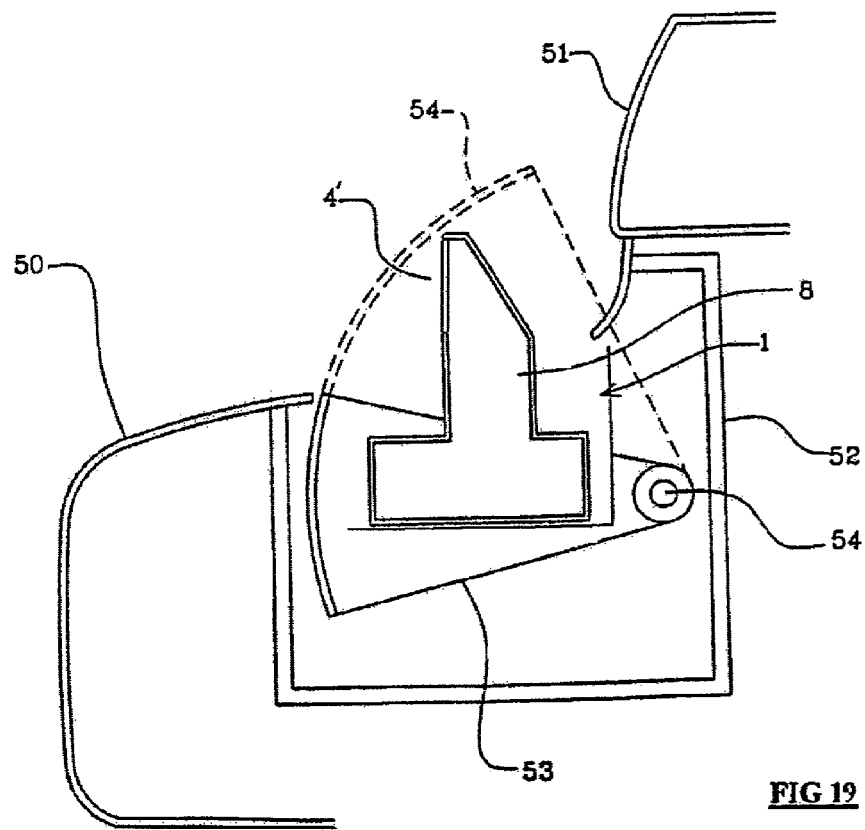
FIG. 19 is a diagrammatic side view illustrating the camera of a further embodiment of the invention.

FIG. 12 shows an alternative embodiment of the invention wherein the lens 4 of FIG. 1 is replaced with a non-distorting window 4' which is substantially transparent to infra-red light. The window is perpendicular to an optical axis, the optical axis being in front of the window and directed toward the roadway when the camera is positioned on a motor vehicle.

FIGS. 13-19 are similar to FIGS. 2-8 except that the lens 4 has been replaced with a non-distorting window 4' which is substantially transparent to infra-red light.

Figure 20:
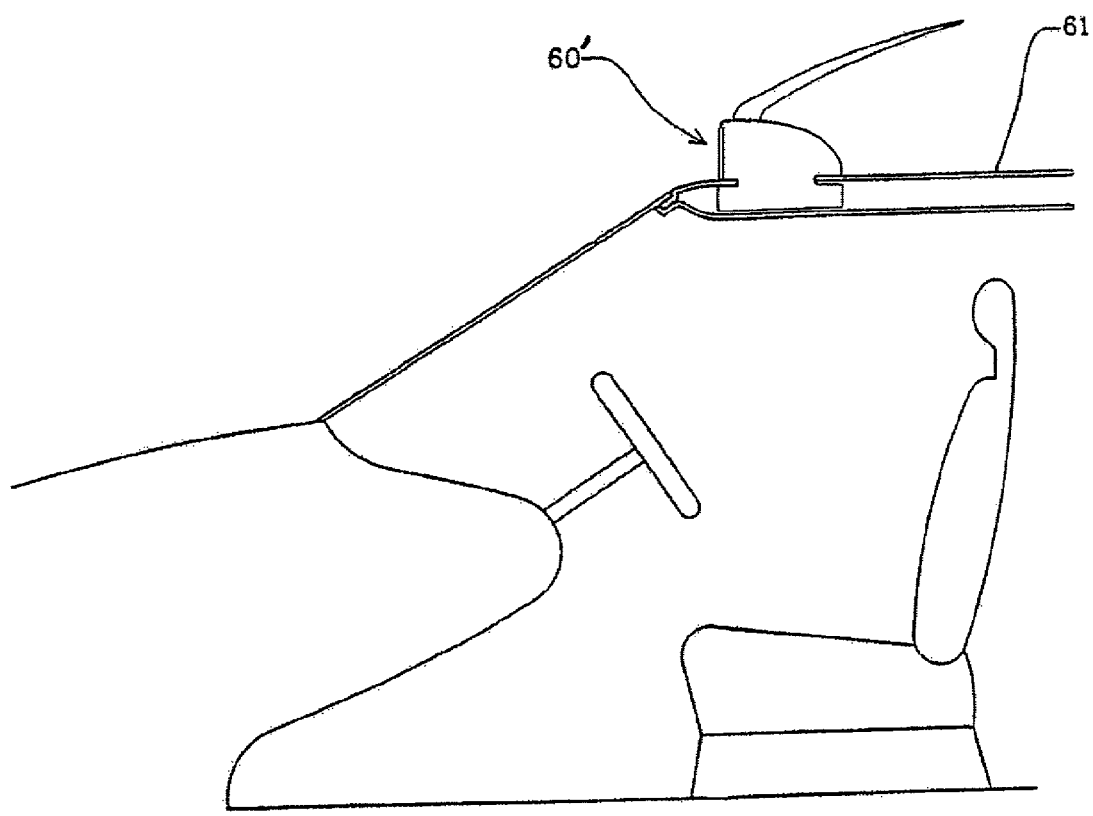
FIG. 20 is a diagrammatic side view of part of a motor vehicle provided with a camera forming part of the embodiment of the invention.

FIG. 20 is similar to FIG. 9 except that the lens 60 has been replaced with a non-distorting window 60' which is substantially transparent to infra-red light.

Figure 21:
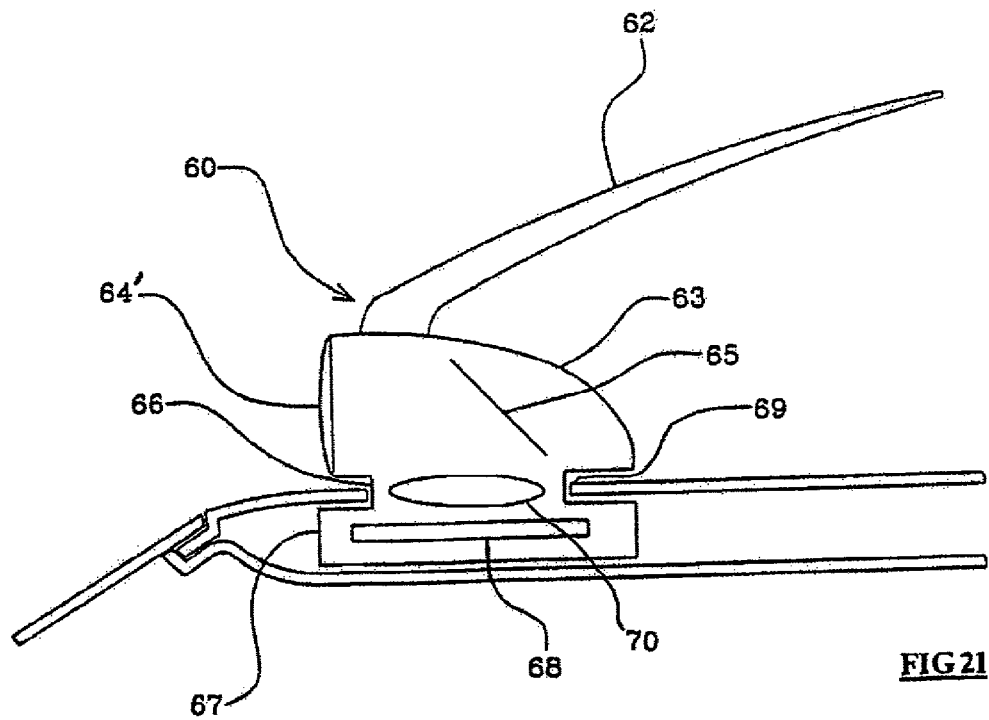
FIG. 21 is an enlarged view of part of FIG. 20.

FIG. 21 shows yet another alternative embodiment of the invention wherein the lens 64 of FIG. 10 is replaced with a non-distorting window 64' which is substantially transparent to infra-red light. For convenience, all features common to both FIGS. 10 and 21 are identified by common reference numbers. In this embodiment, a focusing lens 70 is positioned between the beam deflector 65 and the image detector 68. The beam deflector 65 deflects the beam entering the camera through window 64' by approximately 90.degree. so that the deflected beam is passed through the lens 70 and is focused onto the image detector 68.

Figure 22:
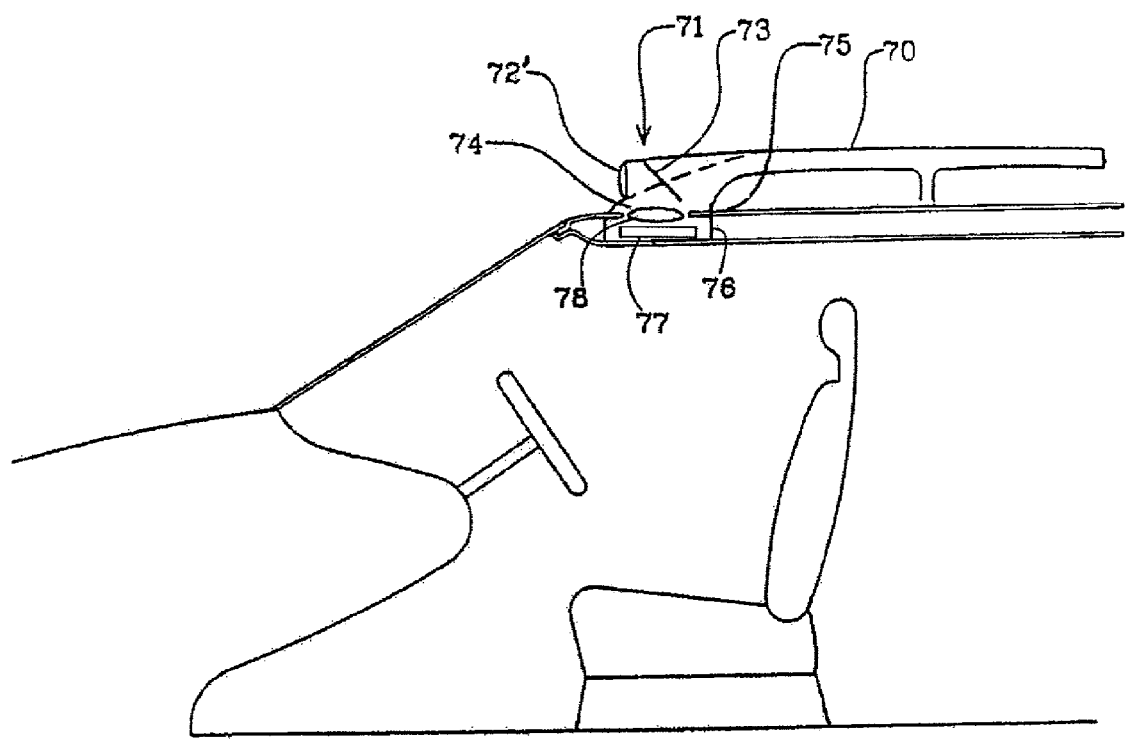
FIG. 22 is a side view of part of a vehicle provided with a camera forming part of yet another embodiment of an invention.

FIG. 22 shows another alternative embodiment of the invention wherein the lens 72 of FIG. 11 is replaced with a window 72' which is substantially transparent to infra-red light. For convenience, all features common to both FIGS. 11 and 22 are identified by common reference numbers. In this embodiment, the lower housing 76 contains an infra-red sensor 77 of the type described above. The beam entering the camera through window 72 is focused onto the infra-red sensor by a lens 78 located between the mirror 73 and the sensor 77.

In all of the described embodiments of the invention, a heater may be provided to heat the optical element of the camera to minimise or obviate condensation on the optical element. The heater may be an electric heater or may be means to direct heated air from the vehicle heating system on to the optical element.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

The invention claimed is:

1. A night vision arrangement for a vehicle, the night vision arrangement comprising:
   a camera, the camera comprising an optical element which is substantially transparent to at least infra-red light, the optical element defining an optical axis, the camera further comprising an infra-red sensor to capture an image received through the optical element, and a beam deflector in alignment with the optical element positioned to deflect a beam received through the optical element and to direct the deflected beam on to the sensor; and
   a display unit to display the captured image to a driver of the vehicle, a part of the camera containing the sensor being mounted within a main envelope of the vehicle with the optical element and the beam deflector, when in an operative position, being beyond said envelope, the beam deflector comprising a planar mirror.

2. The arrangement according to claim 1, wherein the optical element is a lens.

3. The arrangement according to claim 1, wherein the optical element is a non-distorting window.

4. The arrangement according to claim 1, wherein the beam deflector is positioned to deflect the beam through approximately 90°.

5. The arrangement according to claim 1, further comprising a means for heating the optical element of the camera.

6. The arrangement of claim 1, further comprising a means for protecting the optical element from the environment.

7. The arrangement according to claim 6, wherein the means for protecting the optical element from the environment comprises a cover movable to a position in which the optical element is covered.

8. The arrangement according to claim 6, wherein the means for protecting the optical element comprises a means for moving the camera and the optical element so that the optical element is in retracted and protected position.

9. The arrangement according to claim 1, wherein the camera is adapted for being incorporated into a mirror housing.

10. An arrangement according to claim 1, wherein the camera is adapted for being mounted in a fender or bumper.

11. The arrangement according to claim 10, wherein the camera is adapted for being mountable such that the camera is movable vertically between an operative position and a retracted position when mounted.

12. The arrangement according to claim 10, wherein the camera includes a cover movable between a retracted position in which the optical element is exposed and a closed position in which the optical element is covered.

13. The arrangement according to claim 1, wherein the camera is adapted for being mounted on a roof of the vehicle.

14. The arrangement according to claim 13, wherein the camera is adapted for being incorporated in a roof mounted aerial.

15. The arrangement according to claim 13, wherein the camera is adapted for being incorporated in a roof rail.

16. A device for the enhancement of night vision in a vehicle comprising:
   an infra-red camera for being mounted on the vehicle to view an area in front of the camera, and for generating a video signal representing a thermal image of the area, the camera comprising an optical element for passing light therethrough, and an infra-red sensing means for sensing the light passed through the optical element, and an optical means having an elongated neck and conveying infra-red radiation received through the optical element to the infra-red sensing means;
   a processing unit for processing signals from the infra-red sensing means; and
   a display unit coupled to the processing unit for making an image visible to a vehicle operator, wherein the optical means comprises a planar mirror that deflects the light, wherein a part of the camera containing the infra-red sensing means is mounted within the vehicle with the optical element and the planar mirror being positioned or positionable on an exterior of the vehicle.

17. The arrangement according to claim 3, wherein the camera further comprises a separate lens for focusing light passing through the window onto the sensor.

18. The arrangement according to claim 1, further comprising a heater that can heat the optical element of the camera.

19. The arrangement according to claim 1, further comprising a motor for moving the camera and the optical element so that the optical element is in a retracted and protected position.

20. A device for the enhancement of night vision in a vehicle comprising:
- an infra-red camera mountable on the vehicle to view an area in front of the camera, and generating a video signal representing a thermal image of the area, the camera comprising an optical element for passing light therethrough, and an infra-red sensor for sensing the light passed through the optical element, and a beam deflector for conveying infra-red radiation received through the optical element to the infra-red sensor, the beam deflector having an elongated neck;
- a processing unit for processing signals from the infra-red sensor; and
- a display unit coupled to the processing unit for making an image visible to a vehicle operator, the beam deflector comprising a planar mirror, wherein a part of the camera containing the sensor is mounted within the vehicle with the optical element and the planar mirror being positioned or positionable on an exterior of the vehicle.

* * * * *